(12) United States Patent
Kühnle et al.

(10) Patent No.: US 9,057,410 B2
(45) Date of Patent: Jun. 16, 2015

(54) WET FRICTION CLUTCH

(71) Applicant: Schaeffler Technologies AG & Co. KG, Herzogenaurach (DE)

(72) Inventors: Michael Kühnle, Bühl (DE); Toros Güllük, Lichtenau (DE); Peter Wahl, Wörth-Maximiliansau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/097,310

(22) Filed: Dec. 5, 2013

(65) Prior Publication Data
US 2014/0166426 A1 Jun. 19, 2014

(30) Foreign Application Priority Data
Dec. 17, 2012 (DE) .......... 10 2012 223 353

(51) Int. Cl.
*F16D 13/72* (2006.01)
*F16D 13/68* (2006.01)

(52) U.S. Cl.
CPC .............. *F16D 13/683* (2013.01); *F16D 13/72* (2013.01); *F16D 2300/0214* (2013.01)

(58) Field of Classification Search
CPC  F16D 13/683; F16D 13/72; F16D 2300/0214
USPC ................. 192/70.12, 113.3, 113.34, 113.35, 192/70.16; 184/31
See application file for complete search history.

(56) References Cited

U.S. PATENT DOCUMENTS

| 4,270,647 | A  | * | 6/1981 | Leber ........................ | 192/113.35 |
| 6,206,163 | B1 | * | 3/2001 | Schneider ................ | 192/113.35 |
| 6,840,363 | B2 | * | 1/2005 | Braford et al. ............. | 192/70.12 |
| 2011/0000757 | A1 | * | 1/2011 | Muizelaar et al. ......... | 192/70.12 |

FOREIGN PATENT DOCUMENTS

WO  2012175060  12/2012

* cited by examiner

*Primary Examiner* — Rodney H Bonck
*Assistant Examiner* — Lillian Nguyen
(74) *Attorney, Agent, or Firm* — Kathryn A. Warner

(57) ABSTRACT

A wet friction clutch comprising at least one clutch component which is rotatable around a shaft, wherein in the interior of the clutch component a rotary valve component that is rotatable around the shaft is formed which is deflectable by an angle of deflection in comparison to the rotatable clutch component by a relative rotation around the shaft, wherein the rotatable clutch component has at least one first opening and the rotary valve component has at least one second opening, wherein a total opening is released by an at least partial overlapping of the first opening and the second opening, the size of the total opening being dependent on the angle of deflection.

19 Claims, 3 Drawing Sheets

WET FRICTION CLUTCH

CROSS-REFERENCE TO RELATED APPLICATIONS

This patent claims priority of German Patent Application No. 102012223353.9 filed Dec. 17, 2012, which application is hereby incorporated by reference.

FIELD

The invention relates to a wet friction clutch, in particular for motor vehicle construction, for transmitting torque via friction surfaces that are movable toward each other, which are connected with each other by frictional engagement by means of a clamping force.

More particularly, the invention relates to guidance of cooling agent in wet friction clutches, depending on the operating state.

BACKGROUND

When friction clutches are used in motor vehicles, a greater or lesser quantity of operating state-dependent frictional heat develops which must be removed from the friction clutch. Thus a relatively large quantity of frictional heat develops, for example, when engaging or disengaging the clutch, that is, at start-up or when shifting gears, whereas relatively little frictional heat develops during constant travel or in the disengaged state.

BRIEF SUMMARY

The object of the present invention is to specify a wet friction clutch wherein the disadvantages known from the existing art are at least partially surmounted. In particular, a wet friction clutch is to be specified wherein a simple manner of operating state-dependent cooling is possible, and a corresponding method for operating a friction clutch is to be specified.

This object is fulfilled using the features of the independent claim. The subordinate claims are directed at advantageous refinements.

The friction clutch according to the invention comprises at least one clutch component which is rotatable around a shaft, wherein in the interior of the rotatable clutch component a rotary valve component that is rotatable around the shaft is formed which can be deflected by an angle of deflection in comparison to the rotatable clutch component by a relative rotation around the shaft, wherein the rotatable clutch component has at least one first opening and the rotary valve component has at least one second opening, wherein a total opening is released by an at least partial overlapping of the first opening and the second opening, the size of the total opening being dependent on the angle of deflection.

The rotatable clutch component is understood to be in particular a plate basket, a plate carrier or the like. The friction clutch according to the invention is designed so that by turning the rotary valve component relative to the rotatable clutch component, the first opening and the second opening are pushed one over the other or are separated from each other. The free flow-through overlap area of the first opening and the second opening is referred to as the total opening. It should be pointed out that the total opening may also be zero, so that there is no longer any overlap of the first opening and the second opening; that is, the total opening is closed. In this case, during operation no flow of coolant through the total opening is possible at such an angle of deflection. A coolant is understood here in particular as an oil, preferably a mineral oil or synthetic oil.

At start-up and when shifting gears, the clutch, or the individual elements of the clutch have a rotational speed differential between rotating and stationary components, or between components rotating at different speeds. In the present invention, this speed differential is used to achieve a relative movement between rotary valve component and rotatable clutch component. So it is possible, for example, using an element having radial blades, to accelerate the coolant in the wet friction clutch and divert it radially outward through the rotary valve component. That causes the coolant to be conveyed directly to the clutch, so that the cooling efficiency is increased. Furthermore, this diversion of oil brings about a force in a circumferential direction on the rotary valve component, so that the latter turns relative to the rotatable clutch component and thus changes an angle of deflection. In this case, the wet friction clutch is preferably designed so that at start-up, that is, when accelerating the stationary component to the rotational speed of the rotating component, an increasing overlap of the first opening and the second opening occurs, and thus an enlargement of the total opening, thereby increasing the flow of coolant to the rotating component. The result of this is that when there is a great need for coolant, a high supply volume of coolant can be achieved, and thus a high cooling capacity.

If both sides of the clutch are rotating synchronously, that is, if the motor vehicle is traveling at a constant speed, there is no differential in rotational speed. But coolant continues to enter, and is possibly also accelerated from radially inside toward the outside, so that because of the shear flow a small rotational speed differential exists between the rotary valve component and the adjacent coolant in rotation. This results in the angle of deflection becoming smaller and the overlap of the first opening and the second opening being reduced, so that the total opening becomes smaller. This reduces the flow of coolant through the total opening, and thus the cooling capacity. The closing effect based on the rotational speed differential between the accelerated ring of coolant and the rotary valve component can be supported, for example, by the design of a corresponding spring. After minimizing the total opening, there is thus a minimum cooling capacity, which is adequate for constant travel.

The result of this is that when a high heat load is to be dispersed, a high cooling capacity is present, while after rotational speed synchronicity has been engaged on both clutch parts secondary cooling occurs for a certain time, while the total opening becomes smaller and at the same time the cooling capacity is reduced to a minimum value. Thus the wet friction clutch having the rotary valve component allows demand-dependent cooling and dispersal of the occurring frictional heat.

According to an advantageous design, at least one means of adjustment is formed on the rotary valve component, which has an attack surface relative to the shaft in the circumferential direction.

This means that the means of adjustment have an attack surface that is not formed in the circumferential direction, i.e., does not follow the circumferential direction, but rather is formed at an inclination to the circumferential direction or has a component that is inclined in the circumferential direction. This causes a defined force to be present in the circumferential direction, if there is a rotational speed differential between the shaft and the rotatable component which causes or supports a deflection of the rotary valve component.

In a preferred configuration, the at least one first opening and the at least one second opening are formed in a circumferential surface in relation to the shaft.

This allows in a simple manner the necessary acceleration of the ring of coolant radially from inside toward the outside to produce a rotational speed differential and to supply an appropriate volume of coolant to provide an appropriate cooling capacity.

Another advantageous configuration is directed at a minimum of one restoring means being formed, which causes a restoring force to a predefinable angle of deflection.

The restoring means is preferably an elastic element, for example a spring element, which may contain one or more springs, in particular appropriate coil springs. The rotary valve component can thereby be restored in a simple way to a predefinable angle of deflection, for example to an angle of deflection of zero, by utilizing an appropriately shaped and formed spring. Through the choice of the spring, in particular the characteristic curve of the spring, it is possible to specify certain opening and closing characteristics of the rotary valve component, enabling a further adaptation of the characteristic curve of the wet friction clutch to the necessities in the operation thereof.

Another advantageous configuration is directed at the rotatable clutch component being a plate carrier, and preferably an inner plate carrier.

Here, the plate carriers have grooves into which corresponding clutch plates can be inserted, which form friction pairs through which a moment of torque can be disconnectably transmitted from an output shaft to a drive shaft.

The use of a corresponding rotary valve component together with an inner plate carrier, in particular when forming the first opening and the second opening in a circumferential surface of rotary valve component and plate carrier, results in coolant being delivered appropriately to the plates and hence to the friction surfaces. So cooling takes place effectively in particular where the frictional heat occurs.

According to another advantageous configuration, the rotatable clutch component and the rotary valve component each have an inflow opening in an axial direction, through which a liquid can enter during operation.

The first and second openings formed jointly in a circumferential surface result in a deflection of the coolant stream from an axial to a radial direction during operation. Preferably, the friction clutch has means of deflection and acceleration that correspond to this, which provide for a deflection of the coolant stream from the axial direction to the radial direction and for a corresponding acceleration of the coolant during the motion toward radially outside.

According to another preferred configuration, a means of acceleration is formed which causes an acceleration of the coolant from the interior to the exterior in the interior of the rotatable clutch component and of the rotary valve component during operation.

Here, in the interior means in particular that the first and the second openings lie outside the means of acceleration, considered in a radial direction. The acceleration means is preferably a passive acceleration means, which is driven by the rotation of the shaft located inside. This may involve in particular blade structures, interchangeably referred to as vane structures herein, which are connected to the shaft located inside, and which have a form that results in a deflection and acceleration of the coolant from an axial to a radial direction.

Preferably, the means of acceleration comprises a component provided with blade structures that can rotate around the shaft.

According to another aspect of the present invention, a motor vehicle is proposed which has a drive unit with an output shaft as well as a drivetrain and a friction clutch according to the invention, to connect the output shaft disconnectably to the drivetrain. Preferably, the drive unit is situated in the motor vehicle ahead of a driver's compartment and transversely to a longitudinal axis of the motor vehicle.

The friction clutch according to the invention enables a space-saving construction of the clutch while simultaneously optimizing the demand-dependent cooling capacity, which is advantageous in particular also in small high-performance motor vehicles.

Most motor vehicles today have front wheel drive, and therefore by preference position the drive unit, for example an internal combustion engine or an electric motor, in front of the driver's compartment and transversely to the main direction of travel. The construction space in such an arrangement is especially small, and it is therefore especially advantageous to use a friction clutch according to the above description, because this takes up especially little construction space.

The construction space situation becomes more critical in the case of small-class passenger cars according to European classification. The assemblies used in a small-class passenger car are not significantly smaller compared to larger-class passenger cars. Nevertheless, the available construction space is substantially smaller in small cars. The wet friction clutch or dual clutch described above is especially well suited because of its particularly small construction size. Passenger cars are classified in a vehicle class for example according to size, price, weight, power, this definition being subject to constant change according to the needs of the market. In the US market, vehicles of the small car and smallest car class according to European classification are classified as subcompact cars, and in the British market they correspond to the class of super minis, for example the city car class. Examples of the smallest car class are a Volkswagen Fox or a Renault Twingo. Examples of the small car class are an Alfa Romeo Mito, Volkswagen Polo, Ford Fiesta or Renault Clio.

The features listed individually in the patent claims can be combined with each other in any technologically reasonable way, and can be supplemented by explanatory facts from the description and details from the figures, in which case additional variant embodiments of the invention will be shown.

BRIEF DESCRIPTION OF THE DRAWINGS

The invention as well as the technical environment will be explained in greater detail below on the basis of the figures. The figures show especially preferred exemplary embodiments, to which the invention is not limited, however. In particular, it must be pointed out that the figures, and especially the depicted size proportions, are only schematic. The figures show the following.

DETAILED DESCRIPTION

Figure 1:
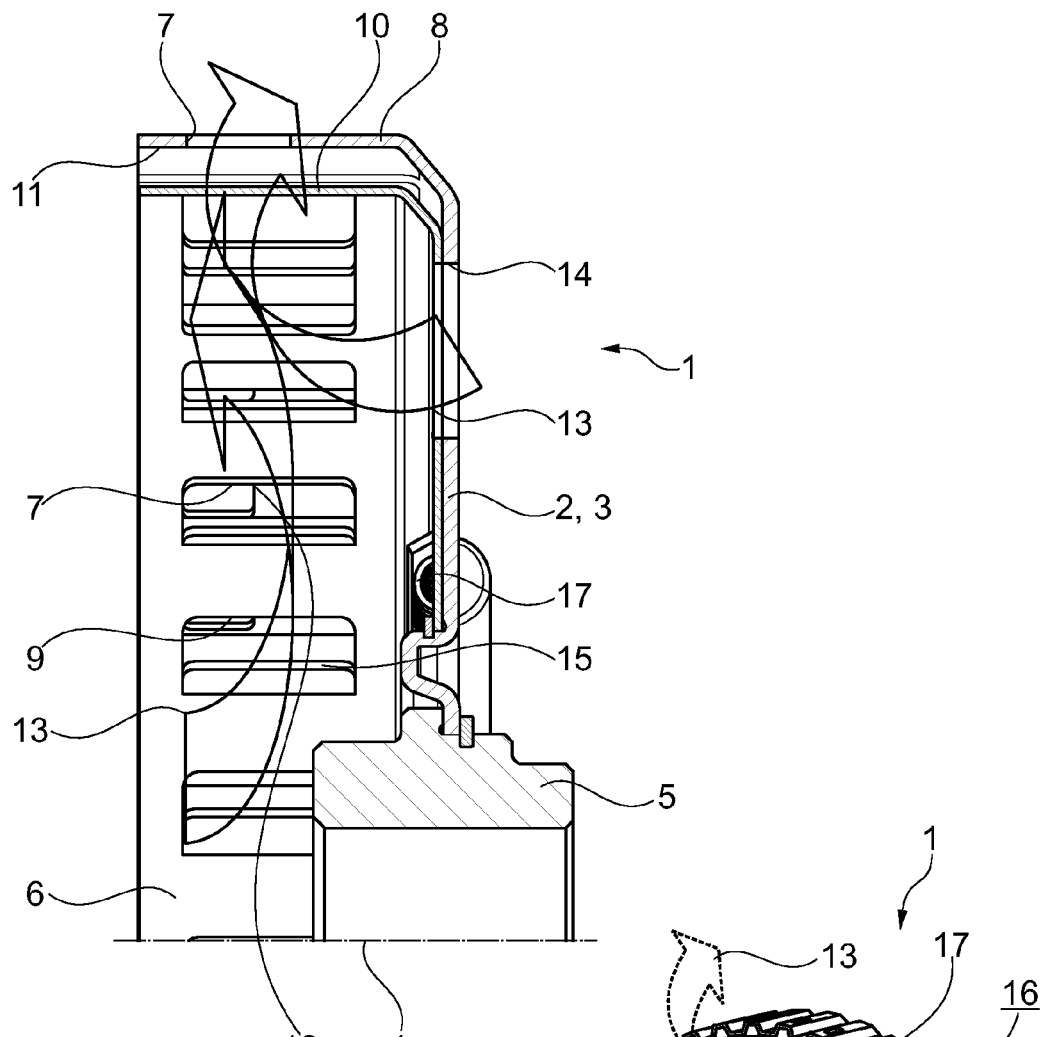
FIG. 1: a cross-sectional partial view of a wet friction clutch with rotary valve component open.

FIG. 1 shows a schematic view of part of wet friction clutch 1. This includes, among other things, rotatable clutch component 2, which includes inner plate carrier 3. For reasons of clarity, the corresponding plates are not shown in this view. Rotatable clutch component 2 is rotatable around shaft 4. To this end, rotating clutch component 2 includes hub 5, which is connected to a corresponding shaft, for example a drive shaft of a drivetrain of a motor vehicle, while other clutch components are connected to an output shaft of a drive unit. So wet friction clutch 1 has components that can rotate at a different rotational frequency. When engaging the clutch, for example when a motor vehicle launches, the corresponding components are accelerated to similar rotational speeds. Since the engagement occurs by means of corresponding frictional forces, it results in a substantial development of heat, which must be dissipated. To this end, at least some regions of the wet friction clutch are filled with a cooling agent, in particular an oil, preferably a mineral oil or synthetic oil. The frictional heat which develops during the process of engaging and disengaging the clutch is dissipated by the movement, and in particular circulation of this coolant.

Frictional heat develops in particular during engagement and disengagement of the friction clutch, i.e., when the various frictional partners are engaged with one another, and in the process change the rotational frequencies and the difference in frequency of the frictional partners. In so-called lamellar (multi-plate) clutches, the corresponding lamellae, not shown here, part of which are hung on inner plate carrier 3 and part on an outer plate carrier located further outside (not shown here), are brought into engagement with each other. In order to be able to dissipate the heat which develops during this process, it is advantageous if an increased flow of cooling agent to the lamellae occurs at this time. To this end, wet friction clutch 1 includes rotary valve component 6. Rotary valve component 6 basically rotates in tandem with rotatable clutch component 2, but can be displaced relative to the latter by rotation around shaft 4. Rotatable clutch component 2 includes a plurality of first openings 7, which are formed in circumferential surface 8 of rotatable clutch component 2. Rotary valve component 6 includes a plurality of second openings 9, which are likewise formed in circumferential surface 10 of rotary valve component 6.

Between rotatable clutch component 2 and rotary valve component 6 is gap 11. Gap 11 is comparatively small, in order to ensure the best possible seal between rotary valve component 6 and rotatable clutch component 2. At the same time, however, gap 11 enables rotary valve component 6 to be steered relative to rotatable clutch component 2 with a relatively small exertion of force.

Figure 2:
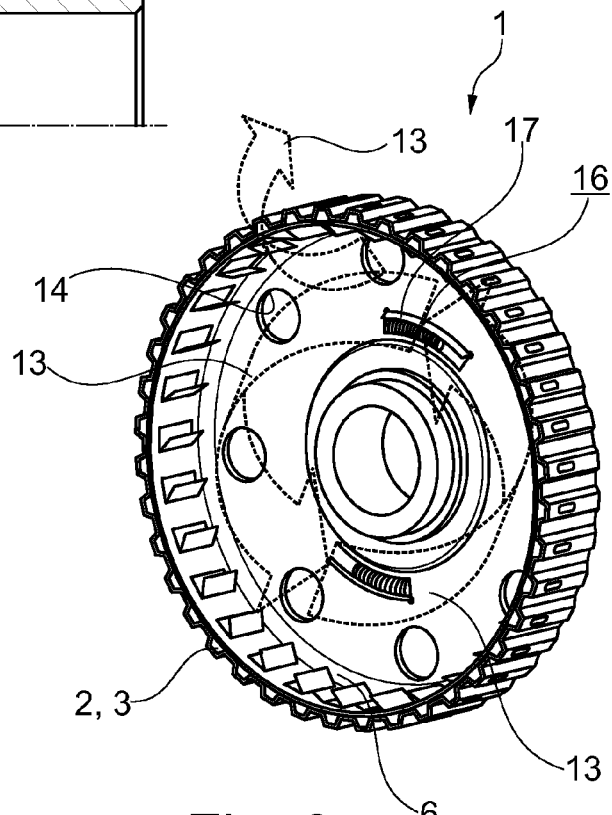
FIG. 2: a first view of a wet friction clutch with rotary valve component open.
Figure 3:
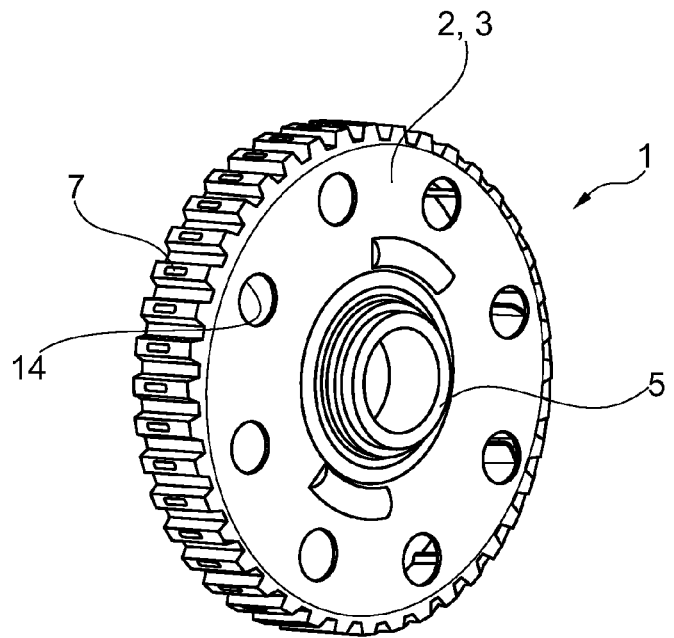
FIG. 3: a second view of a friction clutch with rotary valve component open.

FIG. 1 shows an aspect in which first openings 7 and second openings 9 overlap maximally. In the case of a complete or partial overlap of first opening 7 and second opening 9, total opening 12 forms. This is defined as the freely flowable cross section from inside to outside; that is, viewed radially, from shaft 4 outward through second openings 9 and first openings 7. In the present example, respective first openings 7 are evidently smaller than second openings 9. As a result of this, there is an angular area of the angle of deflection in which total opening 12 is maximized, i.e., in which the entire first opening 7 is freed by the second opening 9. This case is shown schematically by FIGS. 1-3. In this case, coolant flow 13, which is identified in the figures by corresponding arrows, results. In this case, there are flow components of coolant flow 13 which move essentially circumferentially around shaft 4 or hub 5, and other components which have a radial component through total opening 12. In this case, there is a circulation of the coolant which, because of a plurality of axial inflow openings 14, enables a flow of the coolant into the interior of rotatable clutch component 2 and of rotary valve component 6. Inflow openings 14 are preferably designed here so that in the case of rotary valve component 6 and rotatable clutch component 2 they overlap maximally, at least when the total opening is at its maximum.

Second openings 9 in rotary valve component 6 include means of adjustment 15, which on the one hand enable a certain guidance of coolant flow 13 and on the other hand ensure the deflection of rotary valve component 6 relative to rotatable clutch component 2. Means of adjustment 15 is preferably formed at each second opening 9, and are provided with reference labels only by way of example.

Wet friction clutch 1 also includes means of restoring 16. In the present case, means of restoring 16 comprises coil springs 17 which exert a restoring force on rotary valve component 6. This means that in a rest position, i.e. for example at a predefinable angle of deflection, first openings 7 and second openings 9 do not overlap, so that corresponding total opening 12 is zero. There can then be practically no coolant flow 13 through circumferential surface 8 of rotatable clutch component 2. Only a basic stream which exists through the opening of gap 11 can still be present, which results in a relatively slight cooling of the lamellae which are not shown. This is the status that preferably should exist at a constant speed of rotation of drive shaft and output shaft, i.e., at which all of the rotatable components of friction clutch 1 are rotating at same rotational frequencies.

In contrast to this is the situation when friction clutch 1 starts up, i.e. during engagement; that is, when the rotational frequencies of the various clutch components are adjusting, characterized by a great need for cooling power. In this case, there is a difference in rotational speed between a shaft (not shown here) and rotatable clutch component 2, which results in an acceleration of a ring of coolant between shaft 4 and rotatable clutch component 2. This acceleration and rotation of the ring of coolant can be supported and promoted by appropriate acceleration means, which will be described in greater detail later. The rotating ring of coolant which has come about in this way is deflected radially toward the outside by means of adjustment 15 and is guided directly to the outside lamellae or to the clutch, so that the high cooling power which is necessary at this time can be made available. The deflection of coolant flow 13 is directed via means of adjustment 15 to a circumferential force on rotary valve component 6, which results in an opening of total opening 12, that is, to a relative deflection of rotary valve component 6 relative to rotatable clutch component 2. At the same time, there is an overlapping of second openings 9 with first openings 7, partial at first and later complete, and also a flow of coolant 13 directed radially outward, which results in high cooling power and thus dissipation of the developing frictional heat at the outside lamellae or outside frictional partners.

Figures 4, 5:
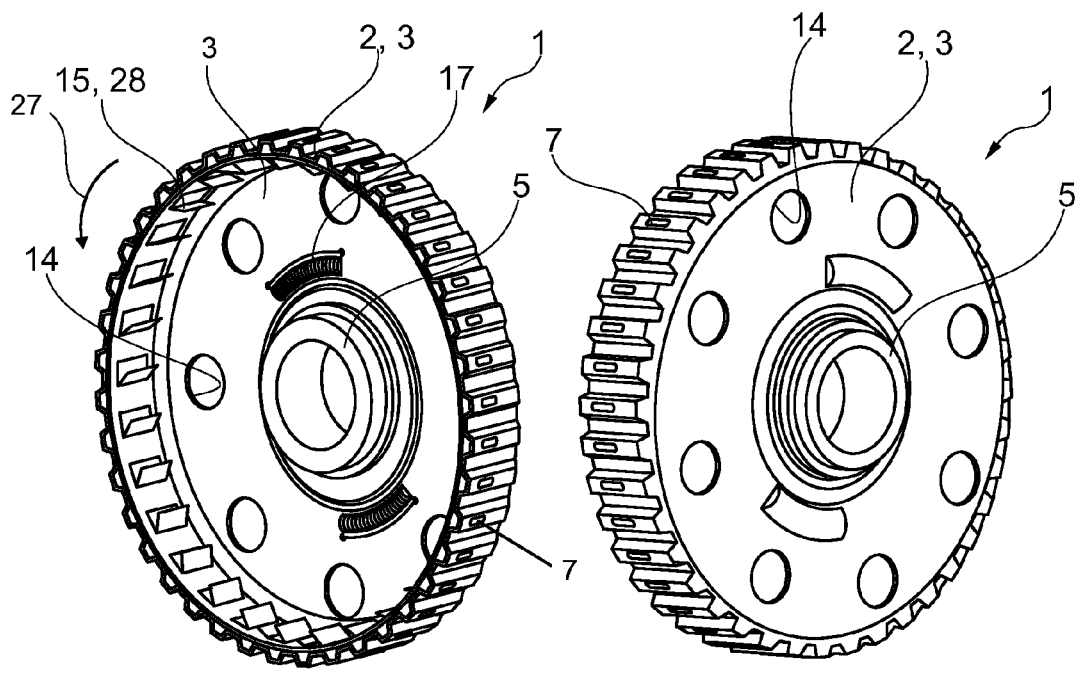
FIG. 4: a first view of a friction clutch with rotary valve component closed.
FIG. 5: a second view of a friction clutch with rotary valve component closed.

FIGS. 4 and 5 show a closed position, in which all rotatable clutch parts are rotating at the same frequency. This is especially the case during constant travel, i.e., when a corresponding motor vehicle equipped with friction clutch 1 is moved at a constant velocity. Hence, in such a situation there is no difference in rotational speed among the different clutch components. However, despite constant travel, it is necessary to continue to feed a certain quantity of coolant to friction clutch 1 immediately after engaging the clutch. This coolant enters radially inward, for example at the hub, and must be brought to the full rotational speed of rotatable clutch component 2 while flowing outward. This occurs for the most part through shear, so that here too there is a relatively small difference in rotational speed between the corresponding ring of coolant and rotatable clutch component 2, caused by the shear. This means that a circumferential force which exists in the opposite direction to the direction in FIGS. 1-3 acts on means of adjustment 15. Means of adjustment 15 includes attack surface 28 in circumferential direction 27 for that purpose. Attack surface 28 does not extend in circumferential direction 27, but is oriented at a non-zero angle from circumferential direction 27. This causes a force to be exerted on rotary valve component 6 which results in a closing of total opening 12, and thus a re-steering of rotary valve component 6 relative to rotatable clutch component 2. This is supported by means of restoring 16. After a certain time, after a return to the initial state of rotary valve component 6 has occurred, the openings for the coolant are thus essentially closed. Until this moment is reached, the total opening is non-zero, but smaller than the total overlap of second opening 9 and first opening 7, so that a certain coolant flow 13 is ensured even in this time period. This is relatively important, since a post-cooling that dissipates the residual frictional heat, which has been absorbed into the individual components after engagement of the clutch, is necessary after the clutch has been engaged. In the closed position, inflow openings 14 are also closed.

Figure 6:
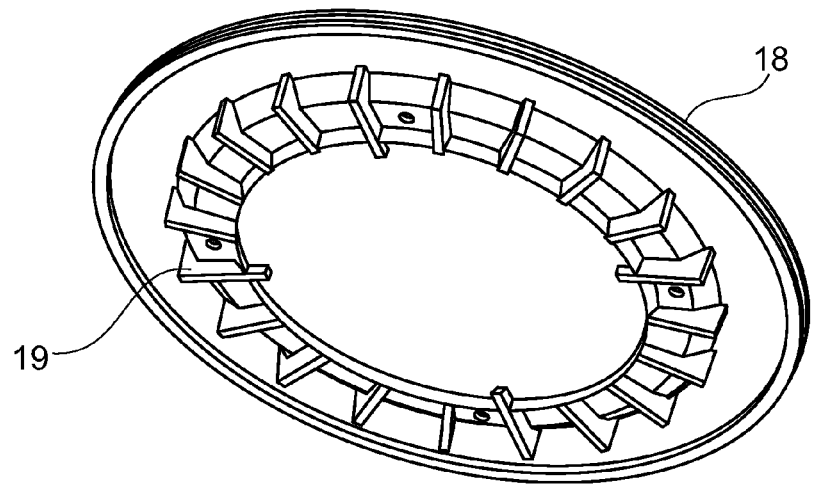
FIG. 6: an example of a means of acceleration.

FIG. 6 shows acceleration means 18, which is formed in the interior of rotary valve component 6 and rotatable clutch component 2. It has radially oriented blade or vane structures 19, which lead radially outward to accelerate the coolant. Thus a rotating ring of coolant forms in the event of a difference in rotational speed.

Figure 7:
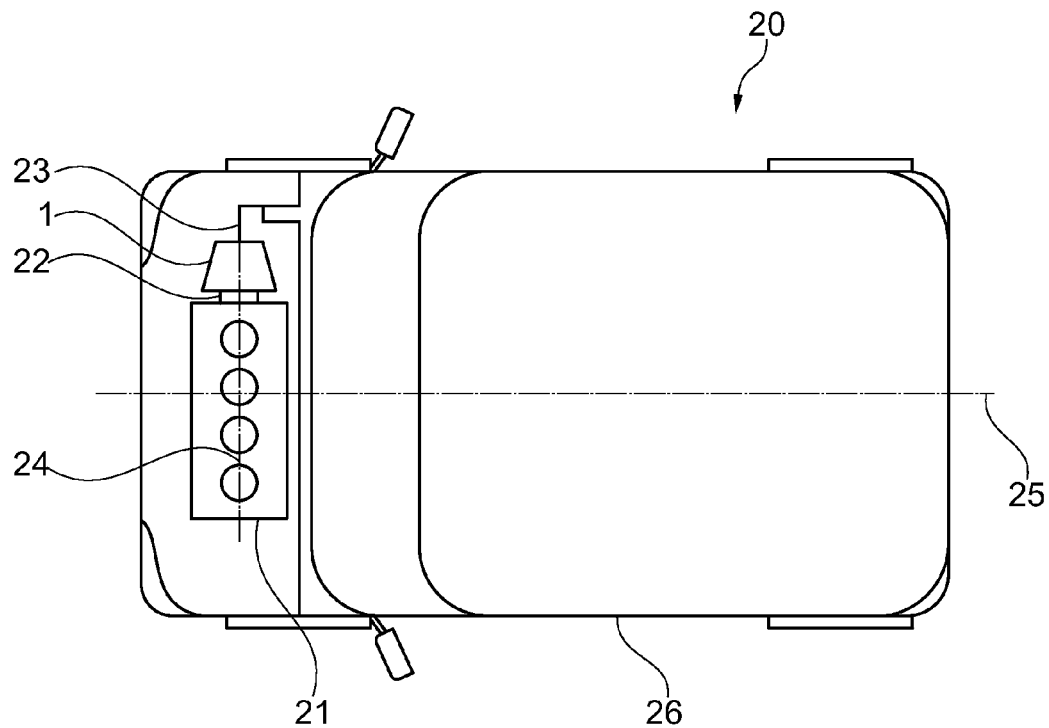
FIG. 7: a motor vehicle.

FIG. 7 shows a schematic view of motor vehicle 20 comprising drive unit 21, for example a combustion engine, which includes output shaft 22 that is connected to wet friction clutch 1 having rotary valve component 6 as described above. By means of friction clutch 1, the output shaft and drivetrain 23 can be detachably connected with each other to transmit torque. Output shaft 22 and at least one drive shaft of drivetrain 23 rotate around axis 24, which is aligned parallel to shaft 4. In motor vehicle 20, drive unit 21 is situated in front of driver's compartment 26 and transversely to longitudinal axis 25 of motor vehicle 20.

REFERENCE NUMERALS 1 wet friction clutch
2 rotatable clutch part
3 inner plate carrier
4 shaft
5 hub
6 rotary valve component
7 first opening
8 circumferential surface
9 second opening
10 circumferential surface
11 gap
12 total opening
13 coolant flow
14 inflow opening
15 means of adjustment
16 means of restoring
17 coil spring
18 means of acceleration
19 vane structure
20 motor vehicle
21 drive unit
22 output shaft
23 drivetrain
24 axis
25 longitudinal axis
26 driver's compartment
27 circumferential direction
28 attack surface

What we claim is:

1. A wet friction clutch, comprising:
    at least one rotatable clutch component, rotatable around a shaft, further comprising:
        a plate carrier or an inner plate carrier; and,
        a rotary valve component:
            rotatable around the shaft;
            formed in the interior of the rotatable clutch component; and,
            deflectable by an angle of deflection relative to the rotatable clutch component by a relative rotation around the shaft;
        wherein the rotatable clutch component has at least one first opening and the rotary valve component has at least one second opening; and,
        wherein a total opening is revealed by an at least partial overlapping of the first opening and the second opening, the size of the total opening being dependent on the angle of deflection.

2. The wet friction clutch according to claim 1, wherein at least one means of adjustment is formed on the rotary valve component, the adjustment means having an attack surface in a circumferential direction relative to the shaft.

3. The wet friction clutch according to claim 1, wherein the at least one first opening and the at least one second opening are formed in a circumferential surface relative to the shaft.

4. The wet friction clutch according to claim 1, wherein at least one restoring means is formed, which causes a restoring force to a predefinable angle of deflection.

5. The wet friction clutch according to claim 1, wherein the rotatable clutch component and the rotary valve component each have at least one inflow opening through which a liquid enters axially during operation.

6. The wet friction clutch according to claim 1, wherein a means of acceleration is formed which causes an acceleration of the coolant radially outward from the interior of the rotatable clutch component and of the rotary valve component during operation.

7. The wet friction clutch according to claim 6, wherein the means of acceleration includes a component with vane structures that is rotatable around the shaft.

8. A wet friction clutch, comprising:
    at least one rotatable clutch component, rotatable around a shaft, comprising:
        at least one plate carrier including a first plurality of inflow openings;
        a rotary valve component disposed radially inward relative to the at least one rotatable clutch component and including a second plurality of inflow openings;
        a rotatable clutch component interior portion, disposed radially inward relative to the at least one rotatable clutch component and the rotary valve component; and
        a restoring means for exertin a restoring force on the rota valve component.

9. The wet friction clutch of claim 8, wherein the at least one rotatable clutch component and the rotary valve component are rotatable at same or different rotational speeds.

10. The wet friction clutch of claim 9, wherein the at least one rotatable clutch component and the rotary valve component are rotatable at different rotational speeds, and the first plurality of inflow openings and the second plurality of inflow openings are at least partially alignable to permit axial flow of a coolant into the interior portion.

11. The wet friction clutch of claim 9, wherein the at least one rotatable clutch component and the rotary valve component are rotatable at same rotational speeds, and the first plurality of inflow openings and the second plurality of inflow openings are misaligned thereby blocking axial flow of a coolant into the interior portion.

12. The wet friction clutch of claim 11, wherein the rotary valve component includes a restoring means, wherein the restoring means is at rest.

13. The wet friction clutch of claim 8, wherein
the at least one rotatable clutch component further comprises a first circumferential surface including a first opening;
the rotary valve component comprises a second circumferential surface including a second opening, where the second opening includes a means of adjustment; and
wherein the first opening and the second opening at least partially overlap to form a total opening.

14. The wet friction clutch of claim 13, wherein the rotary valve component is rotatable around the shaft and is deflectable relative to the rotatable clutch component by a relative rotation around the shaft.

15. The wet friction clutch of claim 13, wherein the means of adjustment protrudes circumferentially inward toward the interior portion and includes an attack surface, wherein the attack surface is oriented at a non-zero angle relative to the circumferential direction.

16. The wet friction clutch of claim 15, wherein the means of adjustment deflects the coolant radially outward, and wherein the rotary valve component is deflectable relative to the rotatable clutch component to increase the total opening.

17. The wet friction clutch of claim 16, wherein
the at least one rotatable clutch component and the rotary valve component are rotatable at different rotational speeds;
the first plurality of inflow openings and the second plurality of inflow openings are at least partially alignable to permit axial flow of a coolant into the interior portion; and
the coolant entering the aligned inflow openings is circulating through the interior portion at its maximum when the total opening is at its maximum.

18. The wet friction clutch of claim 13, wherein the at least one rotatable clutch component and the rotary valve component are rotatable at same rotational speeds, and the total opening is zero.

19. A wet friction clutch, comprising:
at least one rotatable clutch component, rotatable around a shaft, comprising:
at least one plate carrier including:
a first plurality of inflow openings arranged for axial flow; and
a first circumferential surface including a first opening;
a rotary valve component, rotatable around the shaft and disposed radially inward relative to the at least one rotatable clutch component, including:
a second plurality of inflow openings arranged for axial flow; and
a second circumferential surface including a second opening, where the second opening includes a means of adjustment;
a restoring means for exerting a restoring force on the rotary valve component; and
a rotatable clutch component interior portion, disposed radially inward relative to the at least one rotatable clutch component and the rotary valve component;
wherein the at least one rotatable clutch component and the rotary valve component are rotatable at same or different rotational speeds; the rotary valve component is deflectable relative to the rotatable clutch component by a relative rotation around the shaft; and
the first plurality of inflow openings and the second plurality of inflow openings are alignable to block or permit axial flow of a liquid into the interior portion.

* * * * *